(12) United States Patent
Uchiyama

(10) Patent No.: US 8,873,876 B2
(45) Date of Patent: Oct. 28, 2014

(54) IMAGE ENCODER AND IMAGE PROCESSING SYSTEM

(75) Inventor: Masato Uchiyama, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 377 days.

(21) Appl. No.: 13/337,934

(22) Filed: Dec. 27, 2011

(65) Prior Publication Data

US 2013/0077877 A1 Mar. 28, 2013

(30) Foreign Application Priority Data

Sep. 26, 2011 (JP) ................................. 2011-208845

(51) Int. Cl.
*G06K 9/36* (2006.01)
*G06T 9/00* (2006.01)

(52) U.S. Cl.
CPC .... *G06K 9/36* (2013.01); *G06T 9/00* (2013.01)
USPC ....................................................... 382/235

(58) Field of Classification Search
None
See application file for complete search history.

(56) References Cited

U.S. PATENT DOCUMENTS

| 5,347,478 | A | * | 9/1994 | Suzuki et al. | 708/203 |
| 5,442,581 | A | * | 8/1995 | Poland | 708/653 |
| 5,729,228 | A | * | 3/1998 | Franaszek et al. | 341/106 |
| 5,961,617 | A | * | 10/1999 | Tsang | 710/100 |
| 6,067,613 | A | * | 5/2000 | Balmer | 712/32 |
| 6,097,843 | A | | 8/2000 | Takashima et al. | |
| 6,173,305 | B1 | * | 1/2001 | Poland | 708/650 |
| 6,697,930 | B2 | * | 2/2004 | Wise et al. | 712/2 |
| 2002/0122556 | A1 | * | 9/2002 | Horikomi | 380/217 |
| 2003/0215225 | A1 | * | 11/2003 | Kaku | 386/125 |
| 2008/0077771 | A1 | * | 3/2008 | Guttag et al. | 712/204 |
| 2012/0066437 | A1 | * | 3/2012 | Chen | 711/103 |

FOREIGN PATENT DOCUMENTS

| JP | 10-271516 A | 10/1998 |
| JP | 2010-226532 | 10/2010 |

OTHER PUBLICATIONS

Office Action dated Mar. 11, 2014 in Japanese Patent Application No. 2011-208845.
Office Action dated Dec. 13, 2013 in Japanese Patent Application No. 2011-208845.

* cited by examiner

*Primary Examiner* — Jingge Wu
(74) *Attorney, Agent, or Firm* — Knobbe Martens Olson & Bear LLP

(57) ABSTRACT

According to one embodiment, an image encoder configured to write coded image data in a memory includes an encoding module, a write address determining module, and a memory controller. The encoding module divides original image data including a plurality of pixels into a plurality of block lines, divides each block line into a plurality of sub-block lines, encodes the original image data in each sub-block line, and generates a plurality of coded sub-block lines. The write address determining module determines a write address of the memory in each coded sub-block line based on a number of the sub-block lines, an original image data size of the original image data, and image coding rate. The memory controller writes the coded sub-block line in the write address corresponding to the coded sub-block line.

10 Claims, 19 Drawing Sheets

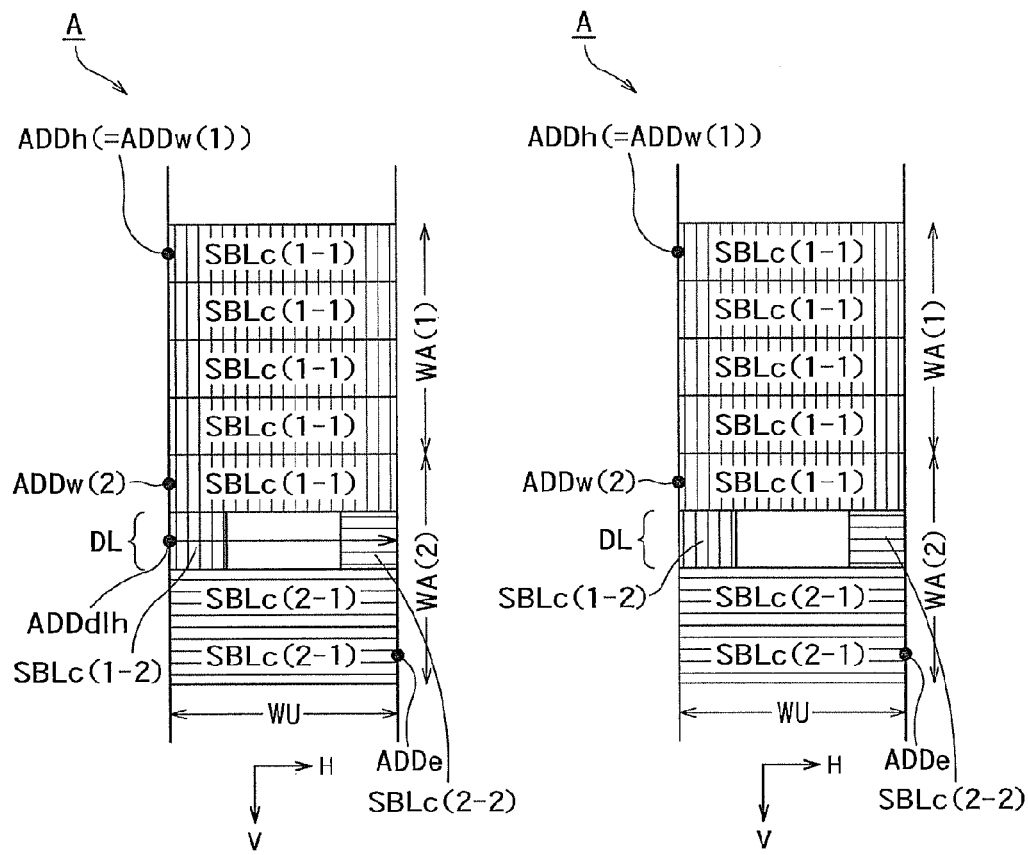
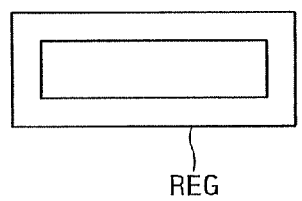
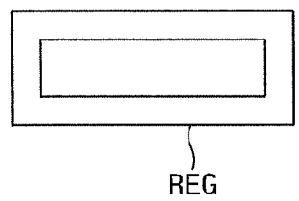
FIG. 14C   FIG. 14D

IMAGE ENCODER AND IMAGE PROCESSING SYSTEM

CROSS REFERENCE TO RELATED APPLICATIONS

This application is based upon and claims the benefit of priority from the prior Japanese Patent Application No. 2011-208845, filed on Sep. 26, 2011, the entire contents of which are incorporated herein by reference.

FIELD

Embodiments described herein relate generally to an image encoder and an image processing system.

BACKGROUND

Conventionally, there is well known an encoding/decoding algorithm in which, in order to guarantee a ratio (hereinafter referred to as a "coding rate") of a data size of coded image data to a data size of original image data, a block line that is of a coding unit is divided into blocks smaller than the block line, and a code amount is controlled such that the code amount varies in each block.

In the encoding/decoding algorithm, a degree of freedom of the control of the code amount is increased with increasing block line, and therefore the coding rate is enhanced. However, because only a part of the block line cannot be read, it is necessary to read a whole of the block line including data to be decoded, even if the data to be decoded is the part of the block line. Accordingly, conventionally, when the data to be decoded is read from a memory, there is a problem that a band width and latency are increased according to the size of the block line.

BRIEF DESCRIPTION OF THE DRAWINGS

FIGS. 14A to 14D are explanatory views illustrating a second example of the operation of the memory controller 16 according to the third embodiment.

DETAILED DESCRIPTION

Embodiments will now be explained with reference to the accompanying drawings.

In general, according to one embodiment, an image encoder configured to write coded image data in a memory includes an encoding module, a write address determining module, and a memory controller. The encoding module divides original image data including a plurality of pixels into a plurality of block lines, divides each block line into a plurality of sub-block lines, encodes the original image data in each sub-block line, and generates a plurality of coded sub-block lines. The write address determining module determines a write address of the memory in each coded sub-block line based on a number of the sub-block lines, an original image data size of the original image data, and image coding rate. The memory controller writes the coded sub-block line in the write address corresponding to the coded sub-block line.

Figure 1:
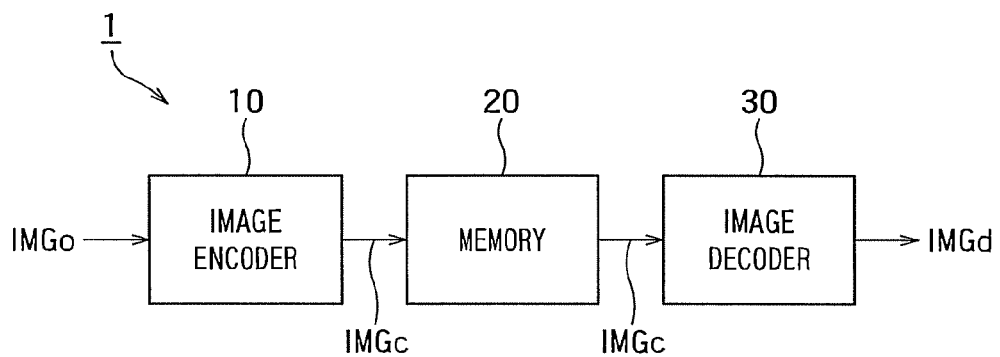
FIG. 1 is a block diagram of the image processing system 1 of the embodiment.

A configuration of an image processing system 1 according to an embodiment will be described below. FIG. 1 is a block diagram of the image processing system 1 of the embodiment. The image processing system 1 includes an image encoder 10, a memory 20, and an image decoder 30. The image encoder 10 is configured to encode original image data IMGo and to write coded image data IMGc in the memory 20. The memory 20 is configured such that the coded image data IMGc can be stored therein. For example, the memory 20 is a DRAM (Dynamic Random Access Memory). The image decoder 30 is configured to decode the coded image data IMGc stored in the memory 20 and to generate decoded image data IMGd. For example, the decoded image data IMGd is outputted to a display (not illustrated). Therefore, an image corresponding to the original image data IMGo is displayed on the display.

Figure 2:
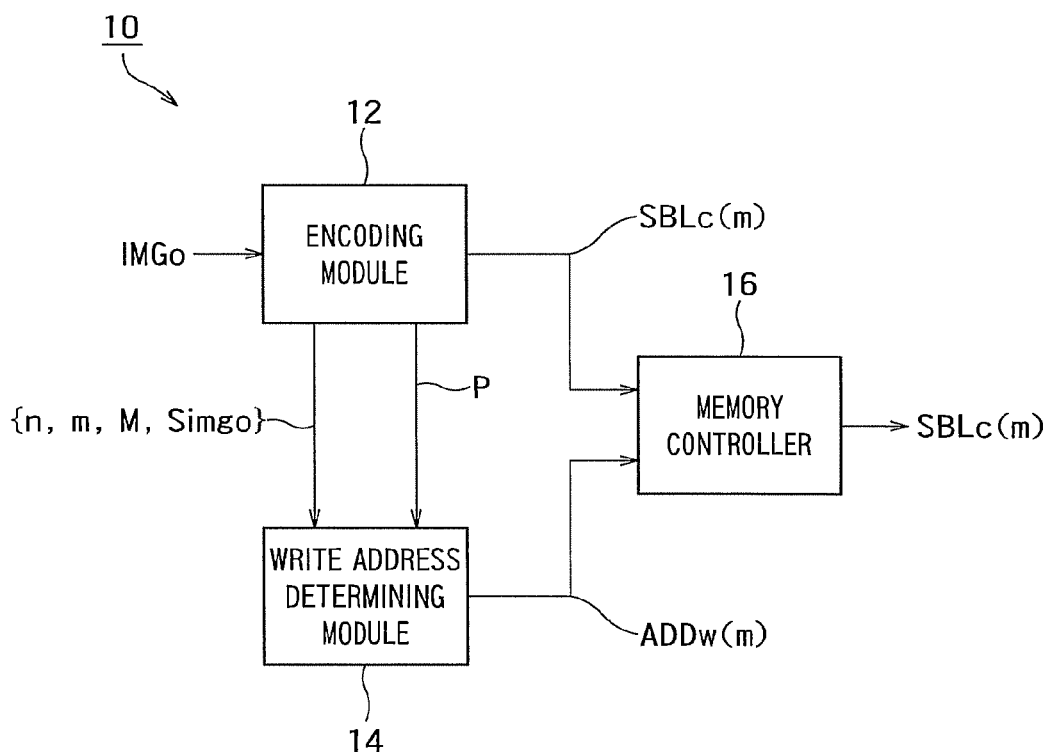
FIG. 2 is a block diagram of the image encoder 10 of the embodiment.
Figure 3A:
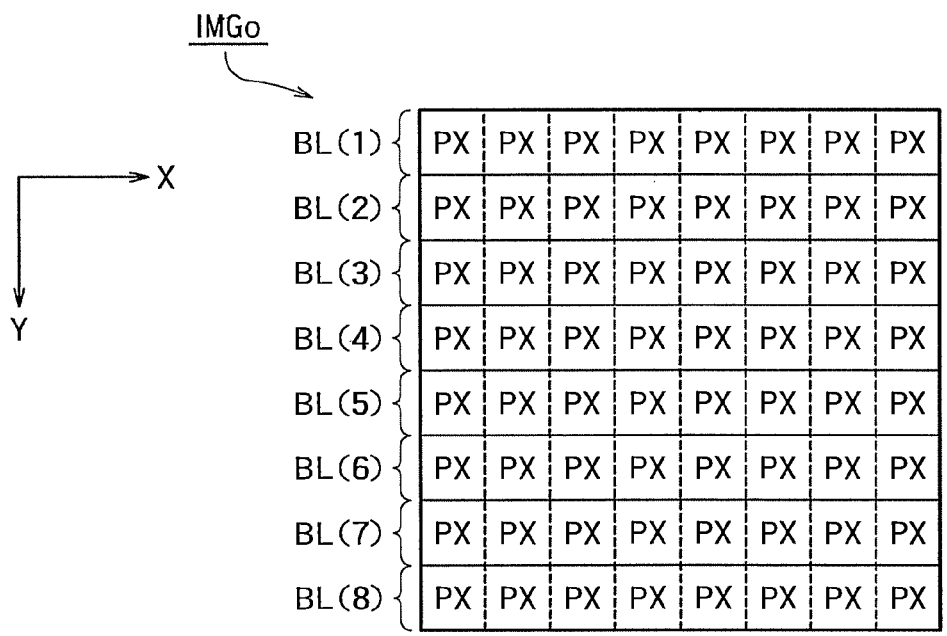
FIGS. 3A, 3B and 4A to 4C are explanatory views illustrating an operation of the encoding module 12 of the first embodiment.
Figure 3B:
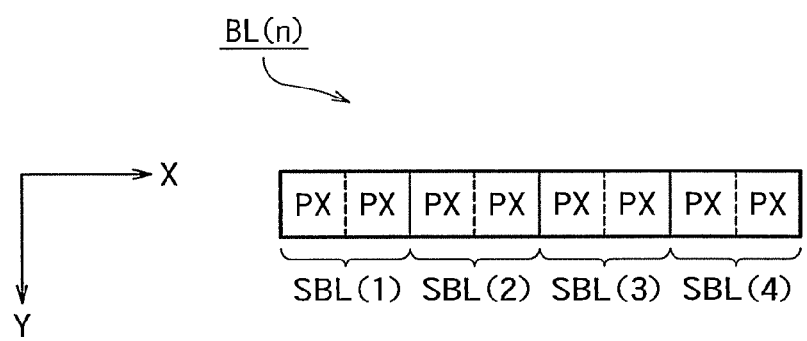
Figure 4A:
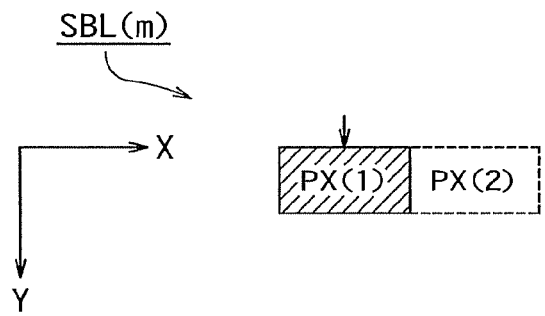
Figure 4B:
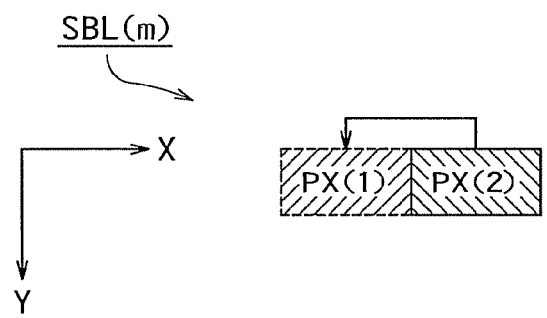
Figure 4C:
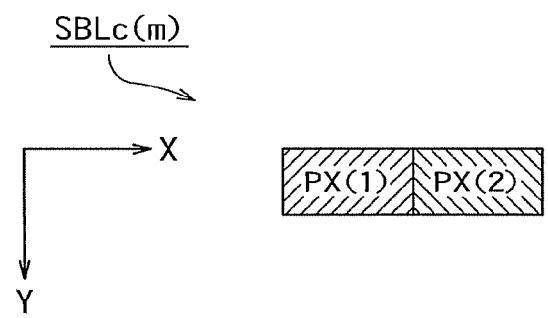

A configuration of the image encoder 10 of the embodiment will be described. FIG. 2 is a block diagram of the image encoder 10 of the embodiment. The image encoder 10 includes an encoding module 12, a write address determining module 14, and a memory controller 16.

Original image data IMGo including I pixels PX(i) (i=1 to I) and an image coding rate P applied to the original image data IMGo are inputted to the encoding module 12, and the encoding module 12 divides the original image data IMGo into N (N is an integer of 2 or more) block lines BL(n) (n=2 to N). The encoding module 12 further divides each block line BL(n) into M (M is an integer of 2 or more) sub-block lines SBL(m) (m=1 to M), encodes each sub-block line SBL(m) at a sub-block line coding rate P(m), and outputs the coded sub-block line SBLc(m) to the memory controller 16. The encoding module 12 also outputs coding parameters (a block line number n, a sub-block line number m, the number of sub-block lines M, and an original image data size Simgo) obtained from the original image data IMGo and the image coding rate P to the write address determining module 14.

At this point, the encoding module 12 determines the sub-block line coding rate P(m) such that a condition of an equation 1 is satisfied. That is, in each sub-block line SBL(m), the sub-block line coding rate P(m) is determined such that the sum of coded sub-block line sizes Sbl(m), which are obtained by coding the M sub-block lines SBL(m) at the different sub-block line coding rates P(m), is not more than a data size of the data that is obtained by coding the original image data IMGo at the image coding rate P.

$$P(m) \leq \frac{Simgo \times P}{N \times \sum_{m=1}^{M} Sbl(m)} \quad \text{(equation 1)}$$

The coding parameters (the block line number n, the sub-block line number m, the number of sub-block lines M, and the original image data size Simgo) and the image coding rate P are inputted to the write address determining module 14, and the write address determining module 14 outputs a write address ADDw(m) to the memory controller 16.

The coded sub-block line SBLc(m) and the write address ADDw(n) are inputted to the memory controller 16, and the memory controller 16 stores the coded sub-block line SBLc(m) in the write address ADDw(n) of the memory 20. The M coded sub-block lines SBLc(1) to SBLc(m) correspond to the coded image data IMGc.

First Embodiment

FIGS. 3A, 3B and 4A to 4C are explanatory views illustrating an operation of the encoding module 12 according to a first embodiment. The encoding module 12 divides the original image data IMGo into the N block lines BL(n). For example, in the case of N=8, the encoding module 12 divides the original image data IMGo including the 8×8 pixel PX into 8 block lines BL(1) to BL(8) each of which has 8 pixels in an X-direction and 1 pixel in a Y-direction (see FIG. 3A).

The encoding module 12 also divides each block line BL(n) into the M sub-block lines SBL(m). For example, in the case of M=4, the encoding module 12 divides the block line BL(n) including the 1×8 pixel PX into 4 sub-block lines SBL(1) to SBL(4) each of which has 2 pixels in the X-direction (see FIG. 3B).

The encoding module 12 encodes each sub-block line SBL(m). Specifically, the encoding module 12 encodes a starting pixel PX(1) independently of each sub-block line SBL(m) (that is, the encoding module 12 encodes it without referring to any pixel), and encodes an (i+1)-th pixel PX(i+1) by referring to an (i)-th pixel PX(i) (that is, the last adjacent pixel), thereby generating the coded sub-block line SBLc(m). For example, the encoding module 12 independently encodes the starting pixel PX(1) of the sub-block line SBL(m) (see FIG. 4A). Then the encoding module 12 encodes a second pixel PX(2) of the sub-block line SBL(m) by referring to the last adjacent pixel PX(1) (see FIG. 4B). Therefore, the coded sub-block line SBLc(m) including the starting pixel PX(1) independently encoded and the pixel PX(2) encoded by referring to the last adjacent pixel PX(1) is obtained (see FIG. 4C).

FIGS. 5A to 5C and 6 are explanatory views illustrating an operation of the write address determining module 14 of the first embodiment. The write address determining module 14 determines a head address ADDh and an end address ADDe using the block line number. The head address ADDh and the end address ADDe define a storage area A in a memory space of the memory 20 (see FIG. 5A). The coded original image data of 1 block line is stored in the storage area A. Using an equation 2, the write address determining module 14 calculates the sub-block line size Sbl from the size Simgo of the original image data IMGo, the number of divided blocks M, and the image coding rate P. Using an equation 3, the write address determining module 14 calculates the end address ADDe from the sub-block line size Sbl and the number of sub-block lines M.

$$Sbl = (Simgo*P)*1/M \quad \text{(equation 2)}$$

$$ADDe = ADDh + M*Sbl \quad \text{(equation 3)}$$

Figure 5A:
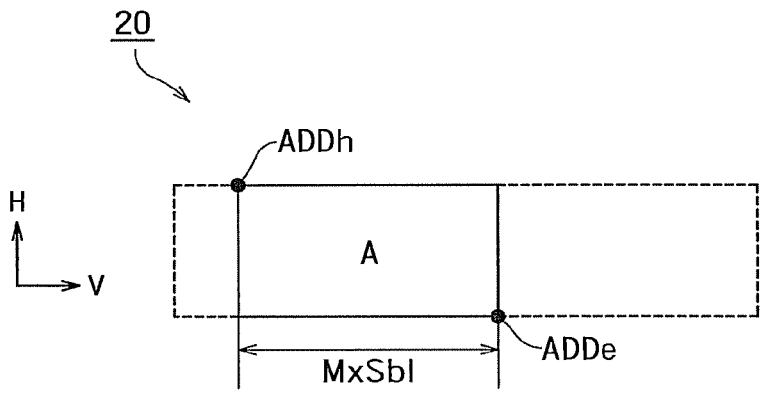
FIGS. 5A to 5C and 6 are explanatory views illustrating an operation of the write address determining module 14 of the first embodiment.
Figure 5B:
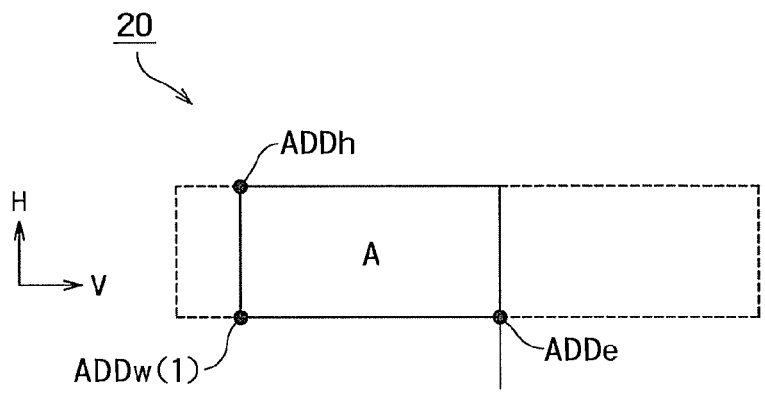
Figure 5C:
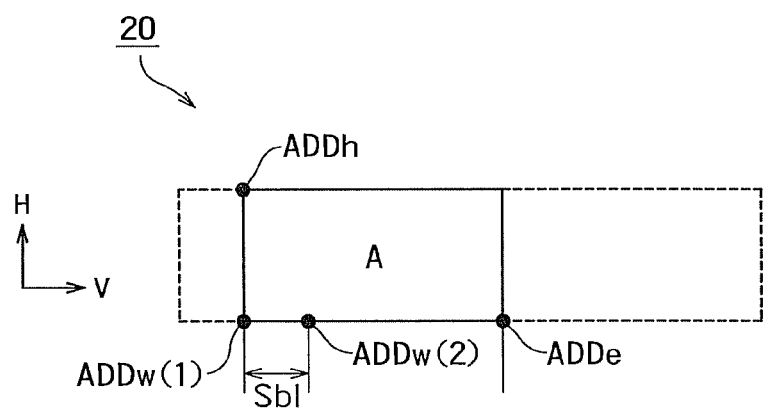
Figure 6:
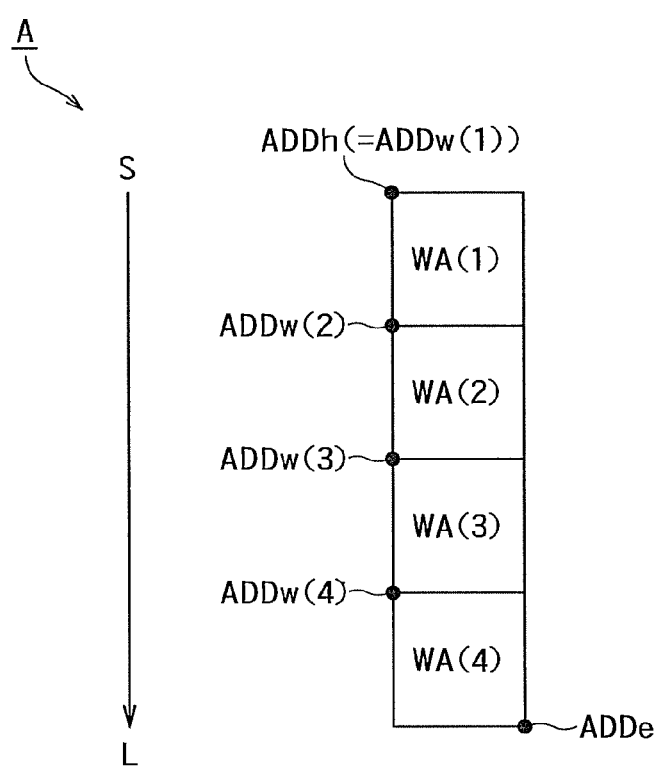

Then the write address determining module 14 determines the head address ADDh of the storage area A as a write address ADDw(1) in which the coded sub-block line SBLc(1) should be written (see FIG. 5B). The write address determining module 14 determines an address, which is located at a distance of 1 block line size Sbl from the write address ADDw(1), as a write address ADDw(2) in which the coded sub-block line SBLc(2) should be written (see FIG. 5C). That is, the write address determining module 14 calculates a write address ADDw(m) using an equation 4. Therefore, in the case of M=4, the storage area A in the memory space of the memory 20 is divided into 4 write areas WA(1) to WA(4) in order of ascending addresses (direction SL) (see FIG. 6). As a result, the write address ADDw(m) in which the m-th coded sub-block line SBLc should be written is uniquely determined.

$$ADDw(m) = ADDh + (m-1)*Sbl \quad \text{(equation 4)}$$

FIG. 7A to 7E are explanatory views illustrating an operation of the memory controller 16 according to the first embodiment. In the memory space, the memory controller 16 writes the coded sub-block line SBLc(1) in the write area WA(1) where the write addresses ADDw(1) is a starting point in forward directions of a horizontal direction (H-direction) and a vertical direction (V-direction) (see FIG. 7A).

Figure 7A:
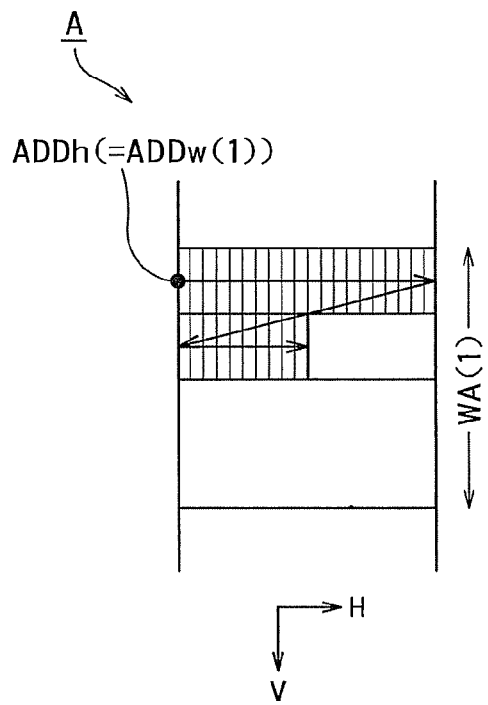
FIGS. 7A to 7E are explanatory views illustrating an operation of the memory controller 16 according to the first embodiment.
Figure 7B:
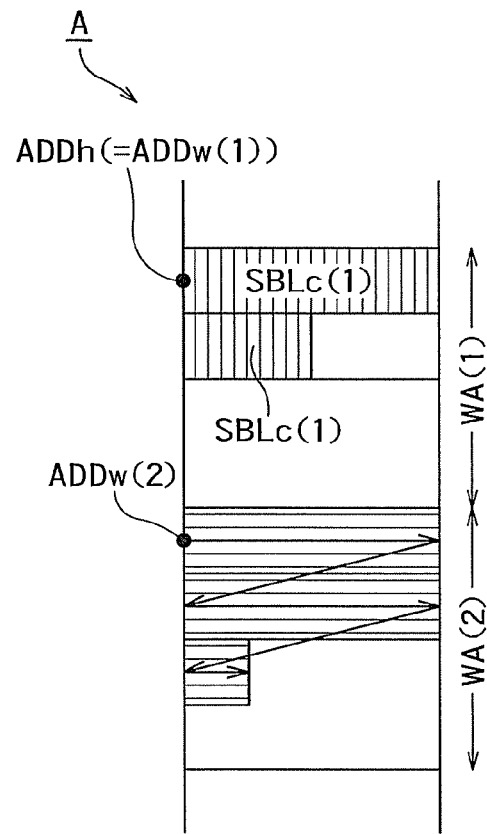
Figure 7C:
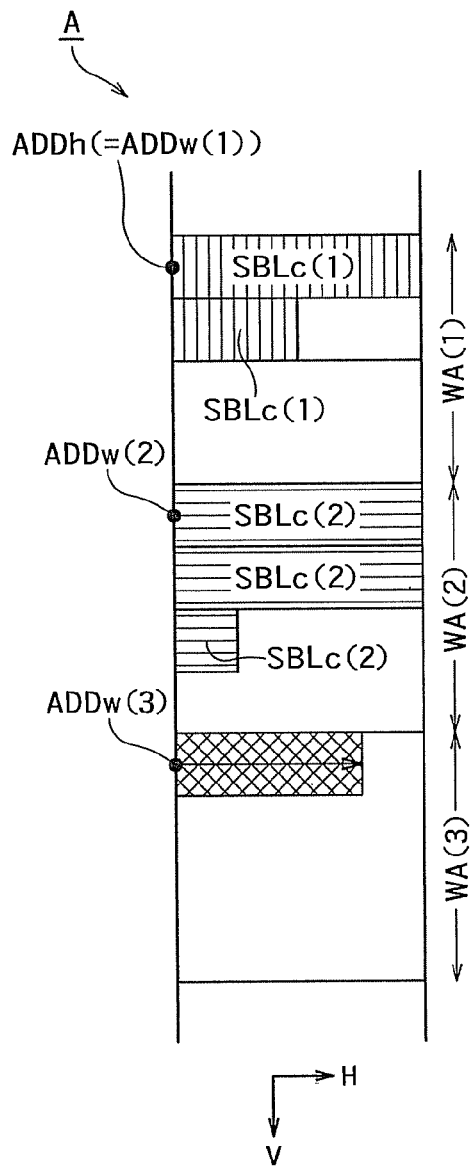
Figure 7D:
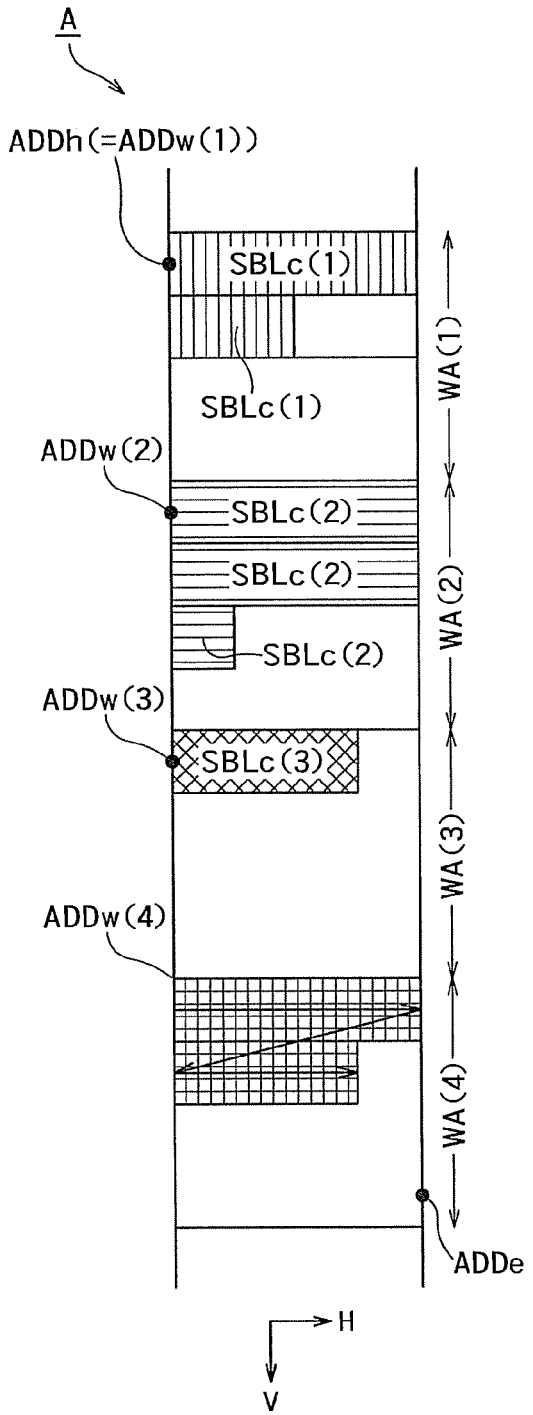
Figure 7E:
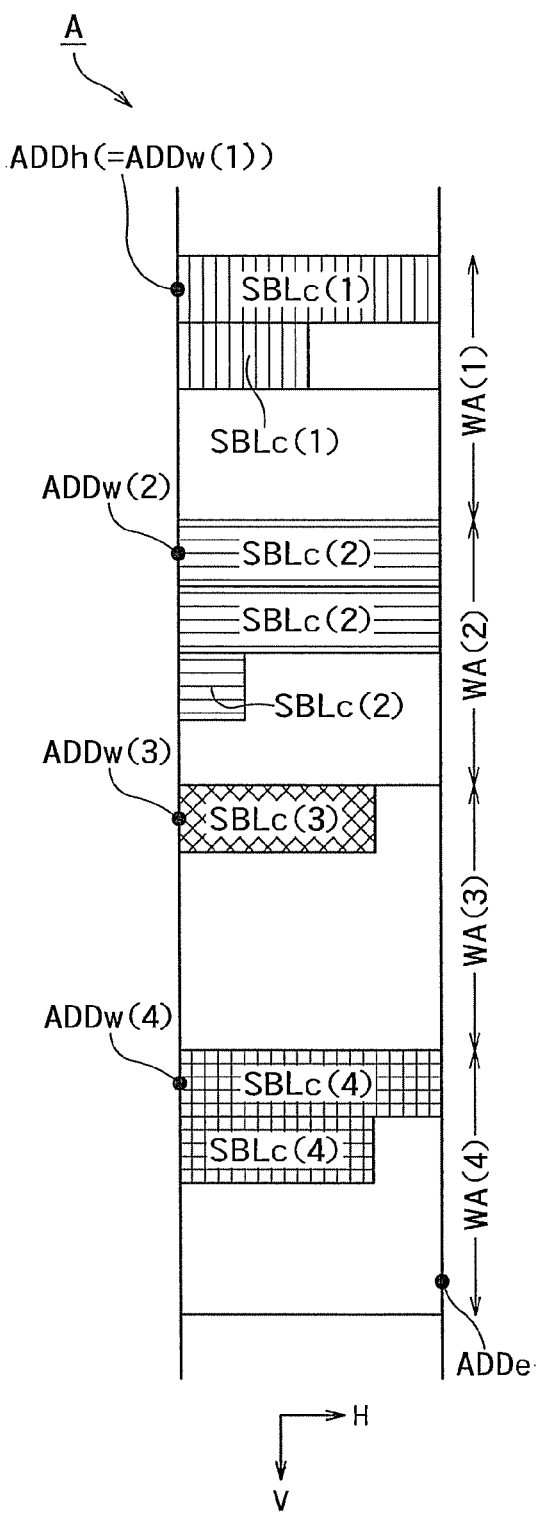

Then, in the memory space, the memory controller 16 writes the coded sub-block lines SBLc(2) to SBLc(4) in the write areas WA(2) to WA(4) where the write addresses ADDw(2) to ADDw(4) are the starting points, respectively, in the forward directions of the H-direction and the V-direction (see FIGS. 7B to 7D). Therefore, the coded sub-block lines SBLc(1) to SBLc(4) corresponding to the original image data IMGo are stored in the write areas WA(1) to WA(4), respectively (see FIG. 7E).

According to the first embodiment, based on the number of sub-block lines SBL M, the original image data size of the original image data IMGo, and the image coding rate P, the write address ADDw(m) of the memory 20 is determined in each coded sub-block line SBLc(m), and the plural coded sub-block lines SBLc are written in the write addresses ADDw(m) corresponding to the coded sub-block lines SBLc(m). This enables the coded sub-block lines SBLc(m) stored in the write addresses ADDw(m) to be individually read. Therefore, for example, when only the coded sub-block line SBLc(2) is decoded, the image decoder 30 can read only the coded sub-block line SBLc(2) without reading the coded sub-block line SBLc(1). This means that a band width of a bus, which is used when the image decoder 30 reads the coded sub-block line SBLc(m), and the number of cycles, which is used when the image decoder 30 decodes the coded sub-block line SBLc(m), are reduced to 1/M. That is, according to the first embodiment, the band width and the latency can be reduced independently of the size of the block line BL when the data (coded sub-block line SBLc(m)) to be decoded is read from the memory 20.

Figure 8A:
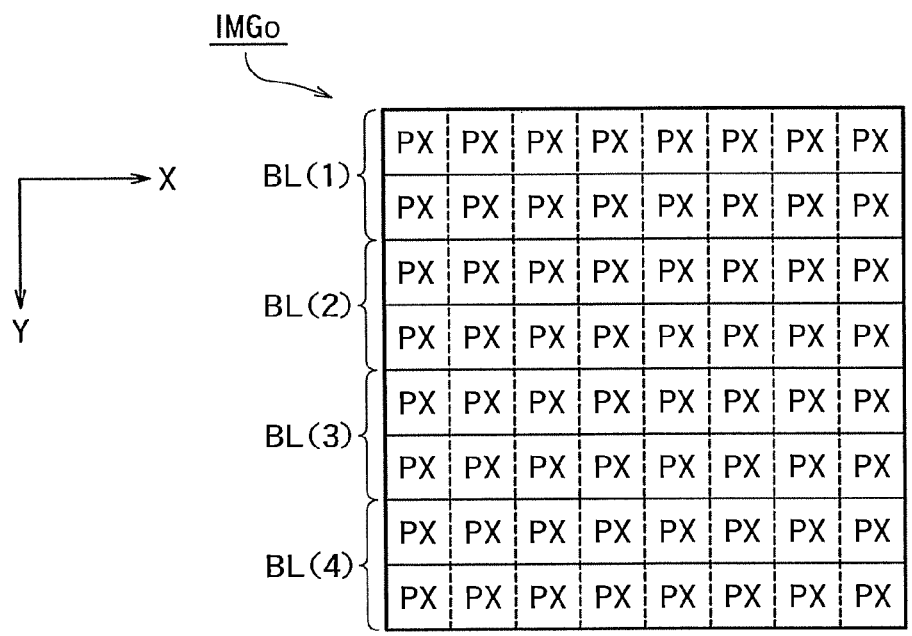
FIGS. 8A and 8B are explanatory views illustrating an operation of the encoding module 12 according to a modification of the first embodiment.
Figure 8B:
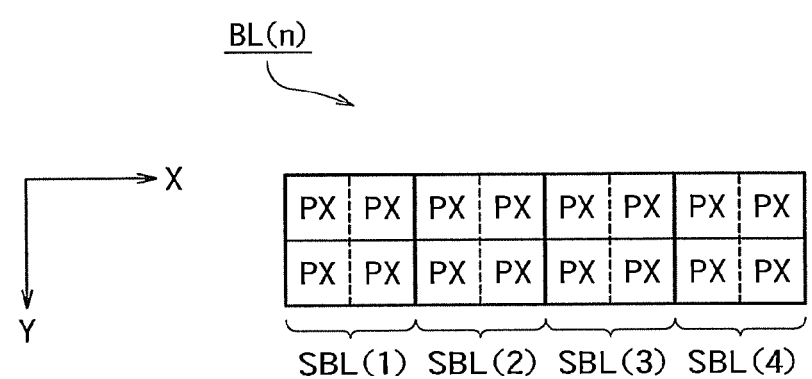

FIGS. 8A and 8B are explanatory views illustrating an operation of the encoding module 12 according to a modification of the first embodiment. One block line includes the plural pixels in the Y-direction. For example, as illustrated in FIG. 8A instead of FIG. 3A, the encoding module 12 may divide the original image data into the 4 block lines BL(1) to BL(4) each of which has 8 pixels in the X-direction and 2 pixels in the Y-direction. In this case, as illustrated in FIG. 8B instead of FIG. 3B, the encoding module 12 may divide each block line BL(n) into the 4 sub-block lines SBL(1) to SBL(4) each of which has 2 pixels in the X-direction and 2 pixels in the Y-direction.

According to the modification of the first embodiment, the band width and the latency can be reduced independently of the size of the block line BL when the data (coded sub-block line SBLc(m)) to be decoded is read from the memory 20.

Second Embodiment

A second embodiment will be described below. In the second embodiment, when 2 preconditions (a first precondition and a second precondition) hold, 2 coded sub-block lines SBLc(1) and SBLc(2) corresponding to the original image data IMGo are written in the 2 write areas WA(1) and WA(2). The same description as the first embodiment is omitted.

The first precondition is that the size of the coded sub-block line SBLc(1) is larger than 1 write area while the size of the coded sub-block line SBLc(2) is smaller than 1 write area. The second precondition is that the coded sub-block lines SBLc(1) and SBLc(2) are not duplicated on a memory line defined by 1 write address ADDw. Whether the first precondition and the second precondition hold is determined by an encoding algorithm used in the encoding module 12.

FIGS. 9A to 9C and 10 are explanatory views illustrating an operation of the write address determining module 14 according to the second embodiment. Similarly to the first embodiment, the write address determining module 14 determines the head address ADDh and the end address ADDe, which define the storage area A in the memory space of the memory 20 (see FIG. 9A). Then, similarly to the first embodiment, the write address determining module 14 determines the write addresses ADDw(1) and ADDw(2) (see FIGS. 9B and 9C). Therefore, the storage area A is divided into 2 write areas WA(1) and WA(2) (see FIG. 10).

Figure 11A:
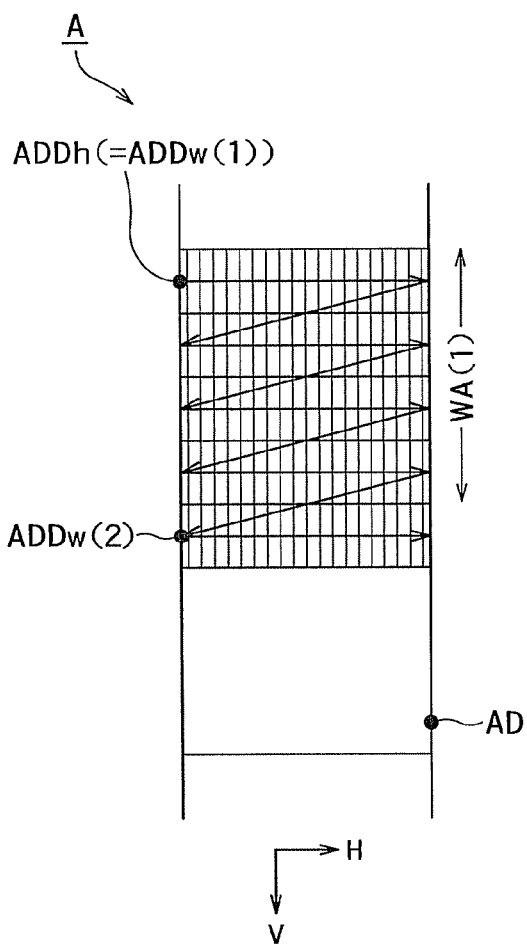
FIGS. 11A to 11C are explanatory views illustrating a first example of an operation of a memory controller 16 according to the second embodiment.
Figure 11B:
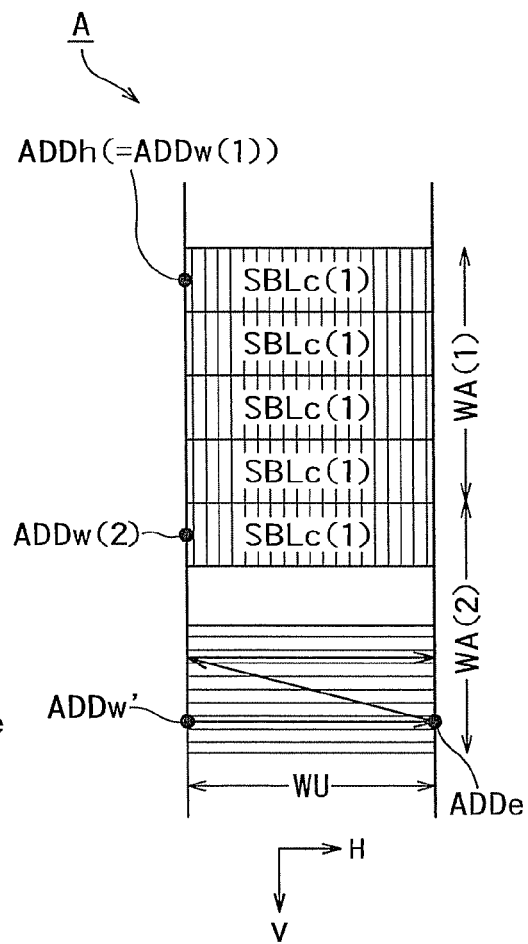
Figure 11C:
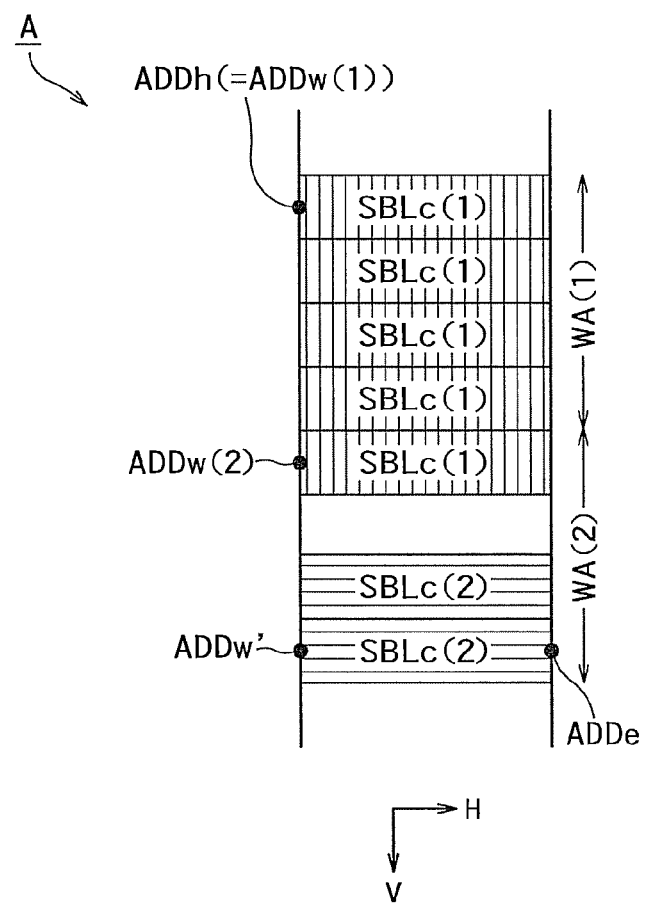

FIGS. 11A to 11C are explanatory views illustrating a first example of an operation of a memory controller 16 according to the second embodiment. In the first example, the coded sub-block line SBLc(1) is written in a whole of the write area WA(1) and a part of the write area WA(2) subsequent to the write area WA(1). In the memory space, the memory controller 16 writes the coded sub-block line SBLc(1) in an area where the write address ADDw(1) is the starting point (that is, the whole of the write area WA(1) and the part of the write area WA(2)) in the forward directions of the H-direction and the V-direction (see FIG. 11A).

Then, using an equation 5, the memory controller 16 calculates a write address ADDw' from the end address ADDe and a write unit WU of the memory 20. The write address ADDw' is an address that returns from the end address ADDe by the write unit WU (for example, 32 bits) of the memory 20. Then, in the memory space, the memory controller 16 writes the coded sub-block line SBLc(2) in an area where the write address ADDw' is the starting point (that is, in the write area WA(2), a portion in which a residual portion SBLc(1)' of the coded sub-block line is not stored) in the forward direction of the H-direction and a reverse direction of the V-direction (see FIG. 11B). Therefore, the coded sub-block lines SBLc(1) and SBLc(2) corresponding to the original image data IMGo are stored in the write areas WA(1) and WA(2) (see FIG. 11C).

$$ADDw' = ADDe - WU \quad \text{(equation 5)}$$

According to the first example of the second embodiment, the first coded sub-block line SBLc(1) is written in the area where the first write address ADDw(1) (=ADDh) is the starting point, and the second coded sub-block line SBLc(2) is written in the area where the second write address ADDw', which returns from the end address ADDe by the write unit of the memory 20, is the starting point. Therefore, a used area of the memory 20 can be reduced compared with the first embodiment.

FIGS. 12A to 12D are explanatory views illustrating a second example of the operation of the memory controller 16 according to the second embodiment. In the second example, the part of the coded sub-block line SBLc(1) is written from a lower end of the second write area WA(2). In the memory space, the memory controller 16 writes a first portion SBLc(1-1) of the coded sub-block line in the write area WA(1) where the write address ADDw(1) is the starting point in the forward directions of the H-direction and the V-direction (see FIG. 12A).

Then, using the equation 5, the memory controller 16 calculates the address ADDw' from the end address ADDe and the write unit WU of the memory 20. In the memory space, the memory controller 16 writes a second portion SBLs(1-2) (that is, in the write area WA(1), a portion in which the data is not written) of the coded sub-block line in the area (that is, a part of the write area WA(2)) where the write address ADDw' is the starting point in the forward direction of the H-direction and the reverse direction of the V-direction (see FIG. 12B).

Figure 12A:
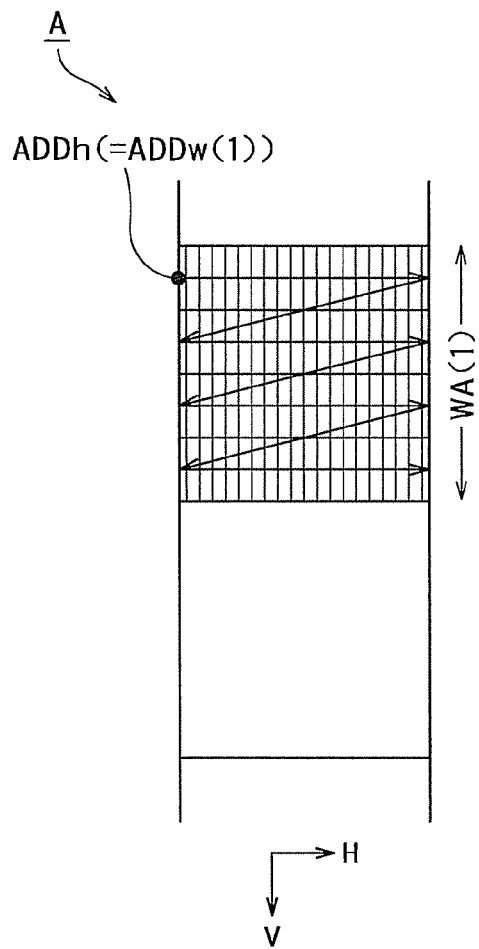
FIGS. 12A to 12D are explanatory views illustrating a second example of the operation of the memory controller 16 according to the second embodiment.
Figure 12B:
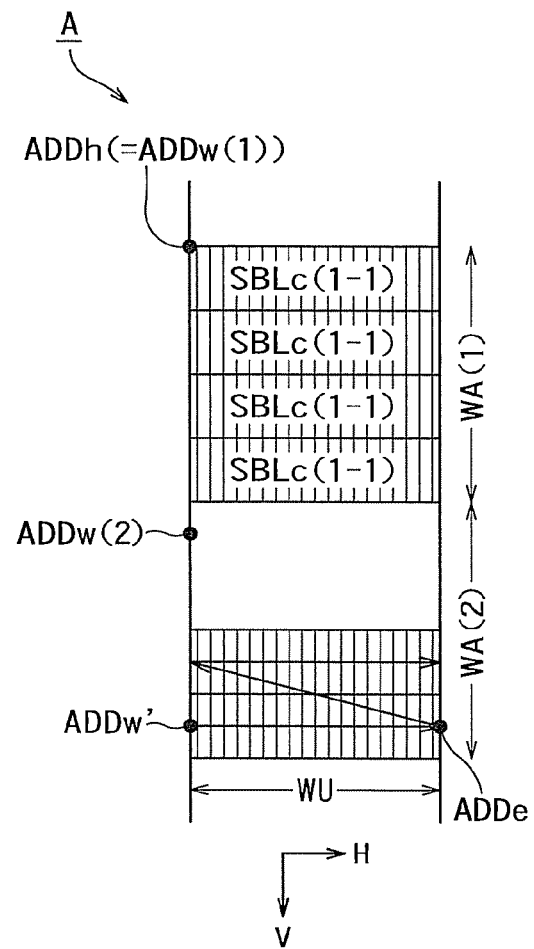
Figure 12C:
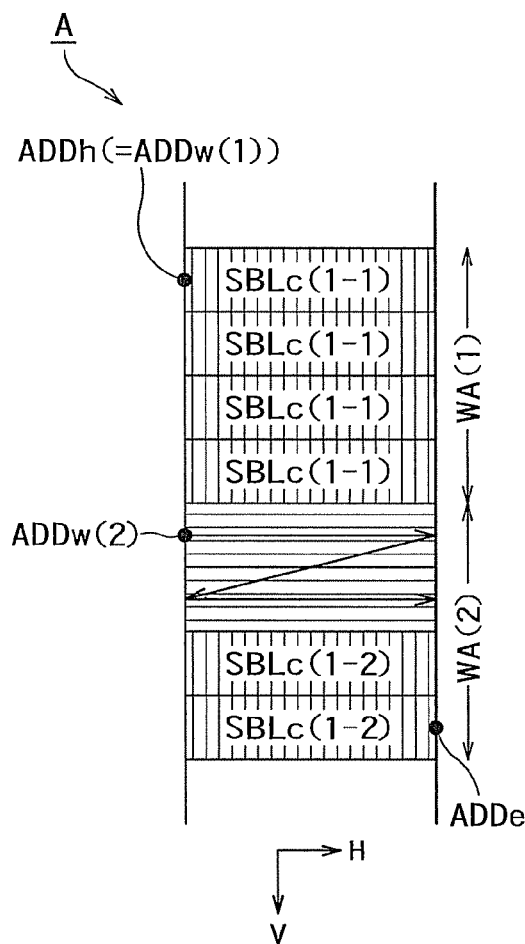
Figure 12D:
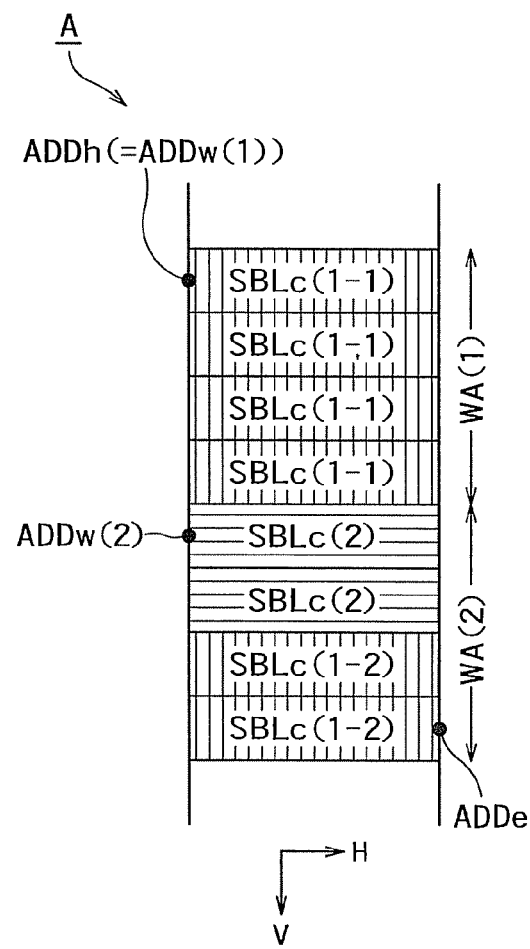

Then, in the memory space, the memory controller 16 writes the coded sub-block line SBLc(2) in a portion, in which a second portion SBLc(1-2) of the coded sub-block line is not stored, in the write area WA(2) where the write address ADDw(2) is the starting point in the forward directions of the H-direction and the V-direction (see FIG. 12C). Therefore, the coded sub-block lines SBLc(1) and SBLc(2) corresponding to the original image data IMGo are stored in the write areas WA(1) and WA(2) (see FIG. 12D).

According to the second example of the second embodiment, the first portion SBLc(1-1) of the first coded sub-block line in the first write area WA(1) where the first write address ADDw(1) (=ADDh) is the starting point, the second portion SBLc(1-2) of the first coded sub-block line is written in the second write area WA(2) where the third write address ADDw' that returns from the end address ADDe by the write unit WU of the memory 20 is the starting point, and the second coded sub-block line SBLc(2) is written in the second write area WA(2) where the second write address ADDw(2) is the starting point. Therefore, even if the size of the first coded sub-block line SBLc(1) is larger than a capacity of the first write area WA(1), the use area of the memory 20 can be reduced compared with the first embodiment.

In the description of the second embodiment, the coded sub-block line size Sbl(1) (that is, the size of the coded sub-block line SBLc(1)) is larger than the coded sub-block line size Sbl(2) (that is, the size of the coded sub-block line SBLc(2) subsequent to the coded sub-block line SBLc(1)). However, the second embodiment can be applied to the case in which the coded sub-block line size Sbl(1) is smaller than the coded sub-block line size Sbl(2).

That is, in the second embodiment, the memory controller 16 writes at least the part of the coded sub-block line SBLc(1) in the first write area WA(1), and writes at least the part of the coded sub-block line SBLc(2) in the second write area WA(2). When the coded sub-block line size Sbl(1) is larger than the size of the first write area WA(1), the memory controller 16 writes the residual portion of the coded sub-block line SBLc(1), which is not stored in the first write area WA(1), in the second write area WA(2). On the other hand, when the coded sub-block line size Sbl(2) is larger than the size of the second write area WA(2), the memory controller 16 writes the residual portion of the coded sub-block line, which is not stored in the second write area WA(2), in the first write area WA(1).

Third Embodiment

A third embodiment will be described below. An image encoder of the third embodiment includes a register REG in which the data of the write unit WU (for example, 1 memory line) of the memory 20 can be stored. In the third embodiment, when the first precondition and the second precondition hold, 2 coded sub-block lines SBLc(1) and SBLc(2) corresponding to the original image data IMGo are written in the 2 write areas WA(1) and WA(2). The same description as the first and second embodiments is omitted.

The first precondition is identical to that of the second embodiment. The second precondition is that a part of the coded sub-block line SBLc(1) and a part of the coded sub-block line SBLc(2) are duplicated on a memory line defined by a head address ADDdIh. Whether the first precondition and the second precondition hold is determined by the encoding algorithm used in the encoding module 12.

Figure 9A:
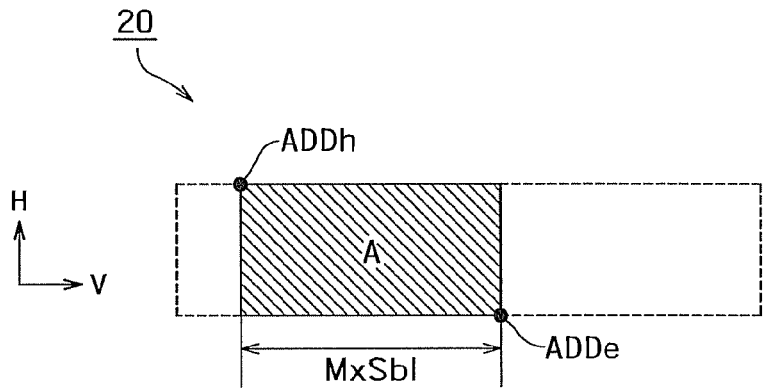
FIGS. 9A to 9C and 10 are explanatory views illustrating an operation of the write address determining module 14 according to the second embodiment.
Figure 9B:
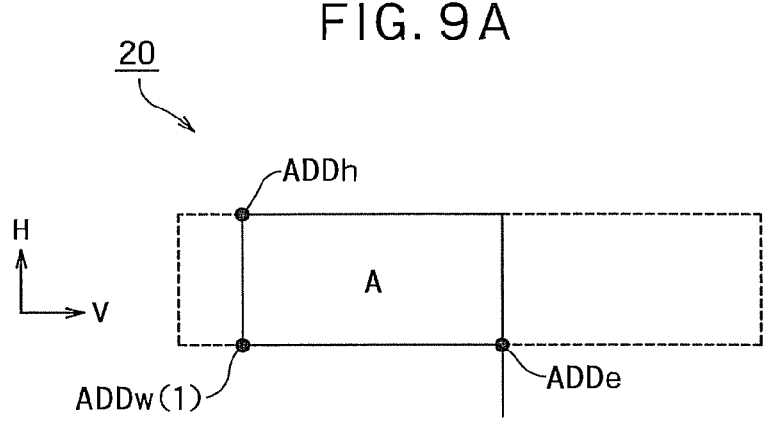
Figure 9C:
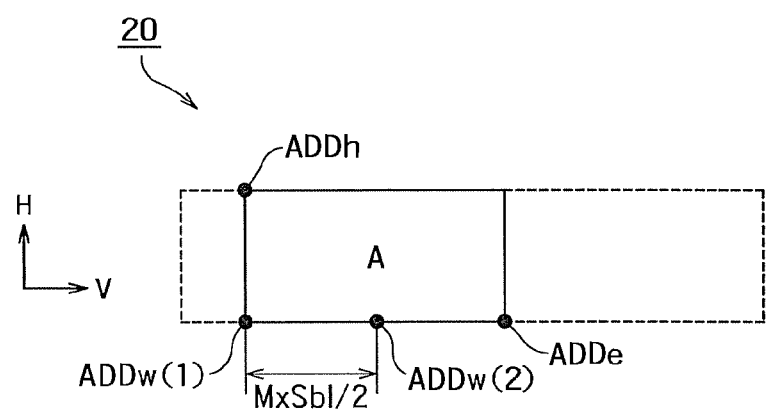
Figure 10:
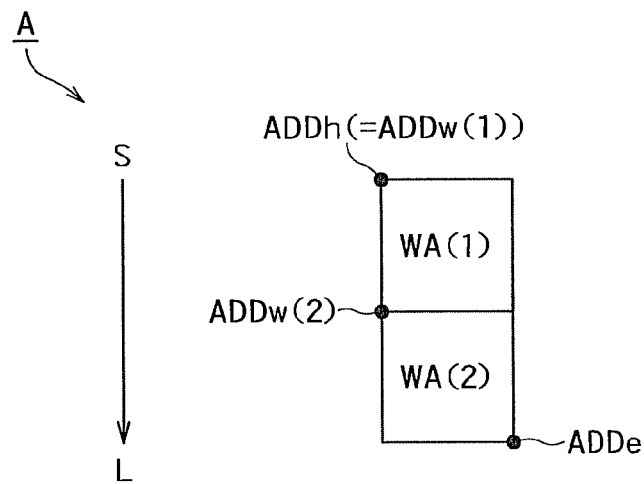

The write address determining module 14 is operated similarly to the second embodiment (see FIGS. 9A to 9C). Therefore, the storage area A is divided into 2 write areas WA(1) and WA(2) (see FIG. 10).

FIGS. 13A to 13E are explanatory views illustrating a first example of an operation of a memory controller 16 according to the third embodiment. In the memory space of the memory 20, the memory controller 16 writes the first portion SBLc(1-1) and the second portion SBLc(1-2) of the coded sub-block line SBLc(1) in the area (that is, the whole of the write area WA(1) and the part of the write area WA(2)) where the write address ADDw(1) is the starting point in the forward directions of the H-direction and the V-direction (see FIG. 13A). The size of the second portion (1-2) of the coded sub-block line SBLc(1) is smaller than that of the write unit WU of the memory 20. Hereinafter a part of the write area WA(2) in which the second portion (1-2) of the coded sub-block line SBLc(1) is written is referred to as a "duplicate memory line DL".

Figure 13A:
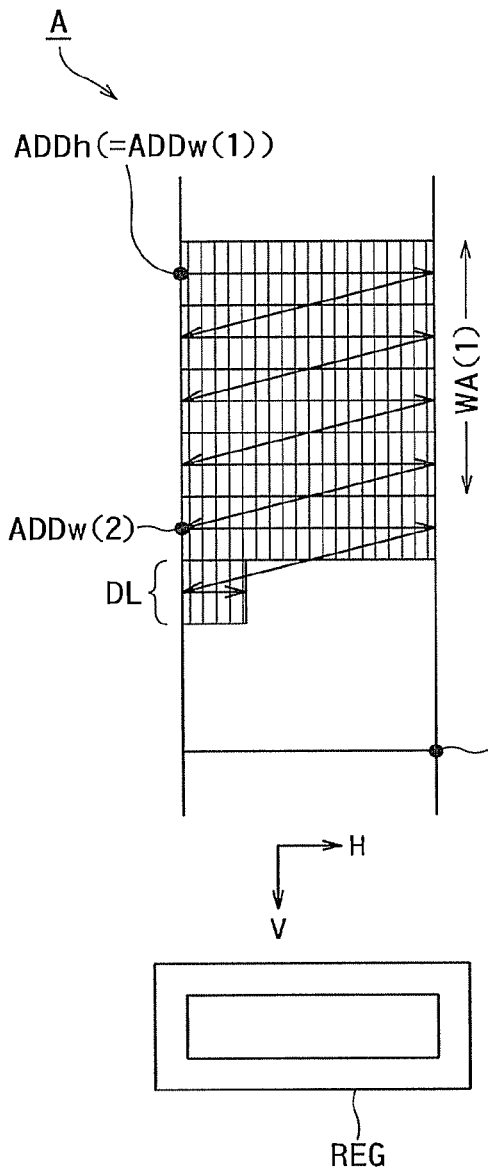
FIGS. 13A to 13E are explanatory views illustrating a first example of an operation of a memory controller 16 according to the third embodiment.
Figure 13B:
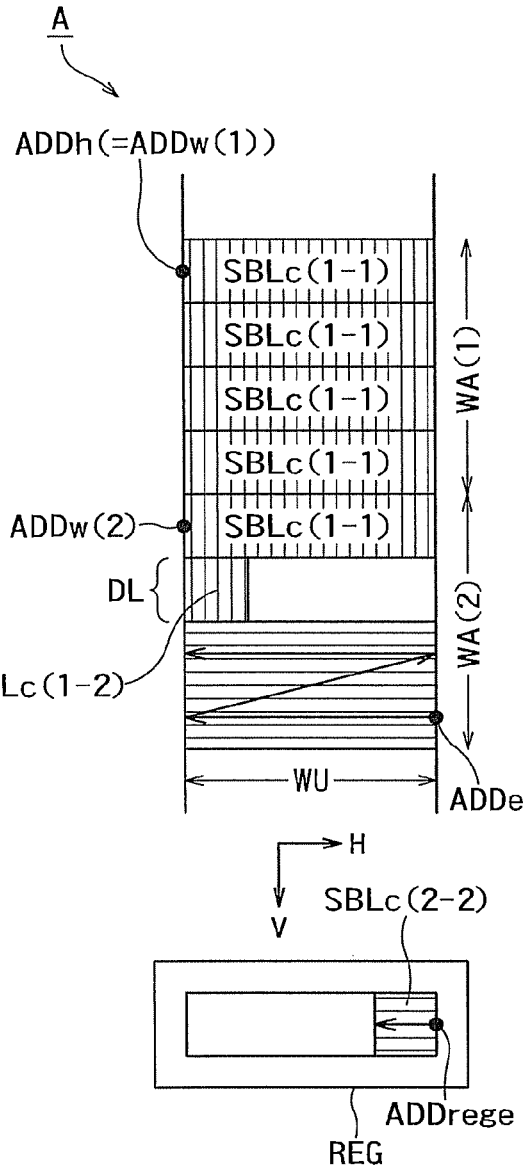
Figure 13C:
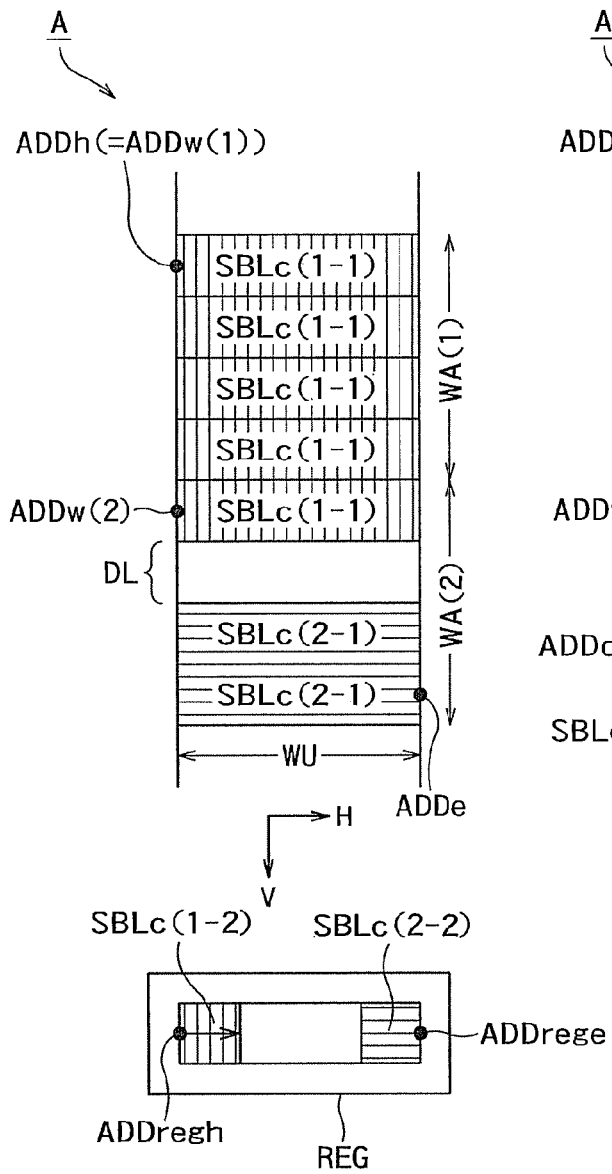

Then, in the memory space, the memory controller 16 writes a first portion SBLc(2-1) of the coded sub-block line SBLc(2) in the area where the duplicate memory line DL is excluded in the write area WA(2) while the end address ADDe is the starting point in the forward direction of the H-direction and the reverse direction of the V-direction (see FIG. 13B). In a register space of the register REG, the memory controller 16 writes a second portion SBLc(2-2) (that is, the portion to be written in the duplicate memory line DL) of the coded sub-block line SBLc(2) in the area where an end address ADDrege of the register REG in the memory controller 16 is the starting point in the reverse direction of the H-direction.

Then the memory controller 16 transfers the second portion SBLc(1-2) of the coded sub-block line SBLc(1), which is stored in the duplicate memory line DL, to the register REG. That is, in the register space, the memory controller 16 writes the second portion SBLc(1-2) of the coded sub-block line SBLc(1) in the area where a head address ADDregh of the register REG is the starting point in the forward direction of the H-direction. Therefore, the line data of l line including the second portion SBLc(1-2) of the coded sub-block line SBLc(1) and the second portion SBLc(2-2) of the coded sub-block line SBLc(2) is stored in the register REG. The memory controller 16 deletes the second portion SBLc(1-2) of the coded sub-block line SBLc(1) from the memory 20 (see FIG. 13C).

Figure 13D:
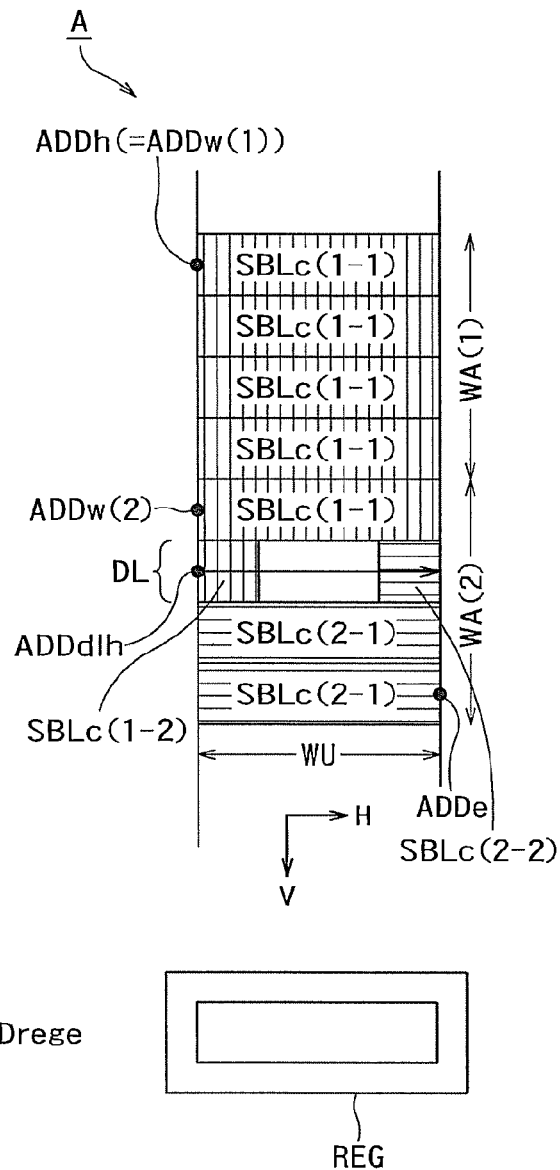
Figure 13E:
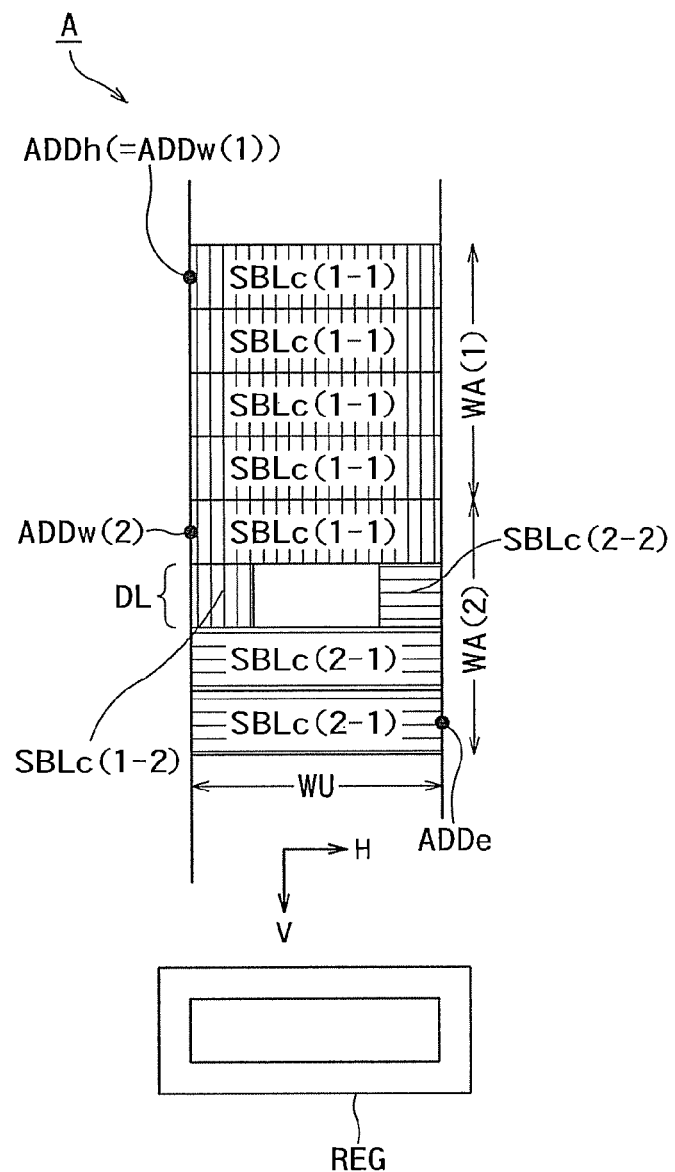

Then, in the memory space, the memory controller 16 writes the line data (second portions SBLc(1-2) and SBLc(2-2)) stored in the register REG in the area where the head address ADDdIh of the duplicate memory line DL is the starting point in the forward direction of the H-direction (see FIG. 13D). The memory controller 16 deletes the second portions SBLc(1-2) and SBLc(2-2) from the register REG. Therefore, the first portion SBLc(1-1) and the second portion SBLc(1-2) of the coded sub-block line SBLc(1) and the first portion SBLc(2-1) and the second portion SBLc(2-2) of the coded sub-block line SBLc(2), which correspond to the original image data IMGo, are stored in the write areas WA(1) and WA(2) (see FIG. 13E).

According to the first example of the third embodiment, after the line data including the second portion SBLc(1-2) of the first coded sub-block line SBLc(1) and the second portion SBLc(2-2) of the second coded sub-block line SBLc(2), which are written in the duplicate memory line DL, is temporarily written in the register REG, the line data stored in the register REG is written in the duplicate memory line DL. Therefore, even if the second portion SBLc(1-2) of the first sub-block line SBLc(1) and the second portion SBLc(2-2) of the second coded sub-block line SBLc(2) are written in 1 duplicate memory line DI, the used area of the memory 20 can be reduced compared with the first embodiment.

FIGS. 14A to 14D are explanatory views illustrating a second example of the operation of the memory controller 16 according to the third embodiment. First, in the memory space, the memory controller 16 writes the first portion SBLc(1-1) of the coded sub-block line SBLc(1) in the area (that is, the whole of the write area WA(1) and the part of the write area WA(2)) where the write address ADDw(1) is the starting point in the forward directions of the H-direction and the V-direction (see FIG. 14A). In the register space, the memory controller 16 also writes the second portion (1-2) of the coded sub-block line SBLc(1) in the area where the head address ADDregh of the register REG is the starting point in the forward direction of the H-direction. The size of the second portion (1-2) of the coded sub-block line SBLc(1) is smaller than that of the write unit WU of the memory 20.

Figure 14A:
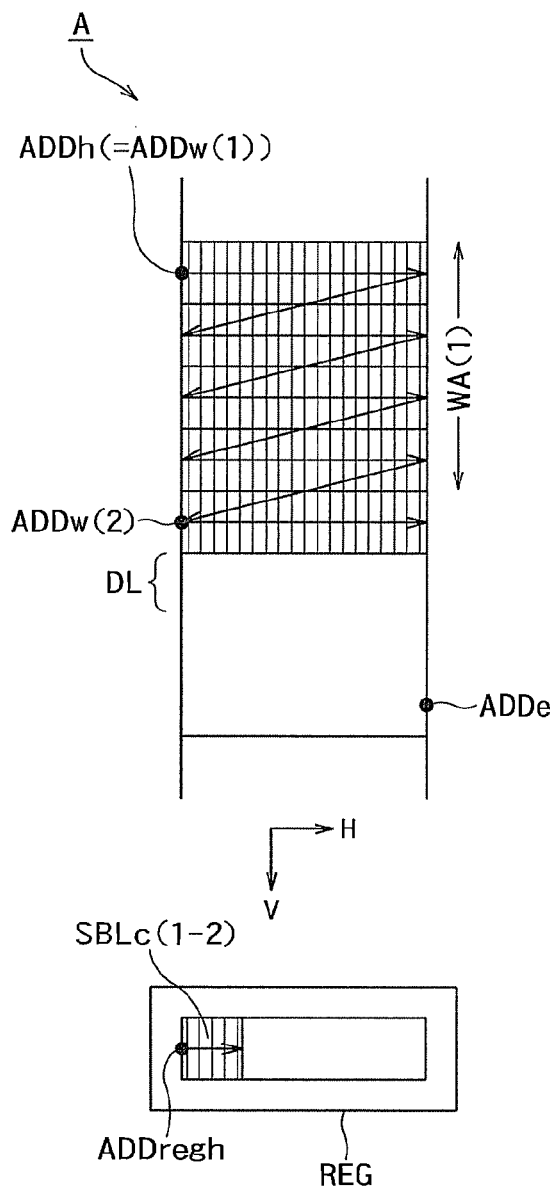
Figure 14B:
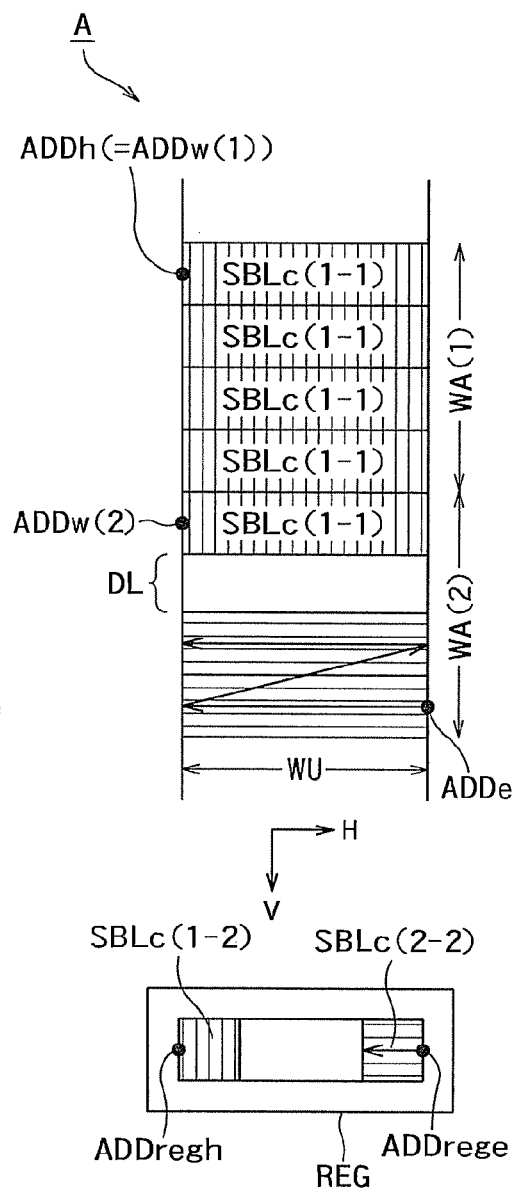

Then, in the memory space, the memory controller 16 writes the first portion (2-1) of the coded sub-block line SBLc(2) in the area where the duplicate memory line DL is excluded in the write areas WA(2) where the end address ADDe is the starting point in the reverse directions of the H-direction and the V-direction (see FIG. 14B). In the register space, the memory controller 16 writes the second portion (2-2) of the coded sub-block line SBLc(2) in the area where the end address ADDrege of the register REG of the memory controller 16 is the starting point in the reverse direction of the H-direction. The size of the second portion (2-2) of the coded sub-block line SBLc(2) is smaller than that of the write unit WU of the memory 20. Therefore, line data of l line including the second portion SBLc(1-2) of the coded sub-block line SBLc(1) and the second portion SBLc(2-2) of the coded sub-block line SBLc(2) is stored in the register REG.

Then, in the memory space, the memory controller 16 writes the line data (second portions SBLc(1-2) and SBLc(2-2)) stored in the register REG in the area where the head address ADDdIh of the duplicate memory line DL is the starting point in the forward direction of the H-direction (see FIG. 14C). The memory controller 16 deletes the second portions SBLc(1-2) and SBLc(2-2) from the register REG. Therefore, the first portion (1-1) and the second portion (1-2)

of the coded sub-block line SBLc(1) and the first portion (2-1) and the second portion (2-2) of the coded sub-block line SBLc(2), which correspond to the original image data IMGo, are stored in the write areas WA(1) and WA(2) (see FIG. 14D).

According to the second example of the third embodiment, after the line data including the second portion SBLc(1-2) of the first coded sub-block line SBLc(1) and the second portion SBLc(2-2) of the second coded sub-block line SBLc(2) is temporarily stored in the register REG, the line data stored in the register REG is written in the duplicate memory line DL. Therefore, the number of cycles necessary for the memory controller 16 to write the coded sub-block line SBLc(m) in the memory 20 can be reduced compared with the first example of the third embodiment.

In the description of the third embodiment, the coded sub-block line size Sbl(1) is larger than the coded sub-block line size Sbl(2). However, the third embodiment can be applied to the case in which the coded sub-block line size Sbl(1) is smaller than the coded sub-block line size Sbl(2).

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image encoder configured to write coded image data in a memory, the encoder comprising:
    an encoding module configured to divide original image data comprising a plurality of pixels into a plurality of block lines, to divide each block line into a plurality of sub-block lines, to encode the original image data in each sub-block line, and to generate a plurality of coded sub-block lines;
    a write address determining module configured to determine a write address of the memory in each coded sub-block line based on a number of the sub-block lines, an original image data size of the original image data, and image coding rate; and
    a memory controller configured to write the coded sub-block line in the write address corresponding to the coded sub-block line, wherein:
    the coded sub-block line comprises a first coded sub-block line comprising a starting pixel of the block line and a second coded sub-block line subsequent to the first coded sub-block line, and
    the memory controller:
        determines a head address and an end address which define a storage area in the memory, the first and second coded sub-block lines being able to be stored in the storage area;
        determines the head address as a first write address;
        determines an address returning from the end address by a write unit of the memory as a second write address;
        writes the first coded sub-block line in a reverse direction of a vertical direction of a memory space in a first write area where the first write address is a starting point; and
        writes the second coded sub-block line in a second write area where the second write address is a starting point.

2. The encoder of claim 1, wherein the memory controller:
    writes the first coded sub-block line in forward directions of horizontal and vertical directions in the memory; and
    writes the second coded sub-block line in the forward direction of the horizontal direction in the memory and in a reverse direction of the vertical direction in the memory.

3. An image encoder configured to write coded image data in a memory, the encoder comprising:
    an encoding module configured to divide original image data comprising a plurality of pixels into a plurality of block lines, to divide each block line into a plurality of sub-block lines, to encode the original image data in each sub-block line, and to generate a plurality of coded sub-block lines;
    a write address determining module configured to determine a write address of the memory in each coded sub-block line based on a number of the sub-block lines, an original image data size of the original image data, and image coding rate; and
    a memory controller configured to write the coded sub-block line in the write address corresponding to the coded sub-block line, wherein:
    the coded sub-block line comprises a first coded sub-block line and a second coded sub-block line subsequent to the first coded sub-block line, and
    the memory controller:
        determines a head address and an end address which define a storage area in the memory, the first and second coded sub-block lines being able to be stored in the storage area;
        determines the head address as a first write address;
        determines an address located at a distance of sub-block line size of the sub-block line from the head address as a second write address;
        writes at least a part of the first coded sub-block line in a first write area where the first write address is a starting point;
        writes at least a part of the second coded sub-block line in a second write area where the second write address is a starting point;
        writes a residual portion of the first coded sub-block line in the second write area when a size of the first coded sub-block line is larger than a size of the first write area, the residual portion being not stored in the first write area; and writes a residual portion of the second coded sub-block line in the first write area when a size of the second coded sub-block line is larger than a size of the second write area, the residual portion being not stored in the second write area.

4. The encoder of claim 3, wherein the memory controller:
writes the first coded sub-block line and the second coded sub-block line in forward directions of horizontal and vertical directions in the memory, and
writes the residual portion in the forward direction of the horizontal direction in the memory and in a reverse direction of the vertical direction in the memory.

5. An image encoder configured to write coded image data in a memory, the encoder comprising:
an encoding module configured to divide original image data comprising a plurality of pixels into a plurality of block lines, to divide each block line into a plurality of sub-block lines, to encode the original image data in each sub-block line, and to generate a plurality of coded sub-block lines;
a write address determining module configured to determine a write address of the memory in each coded sub-block line based on a number of the sub-block lines, an original image data size of the original image data, and image coding rate; and
a memory controller configured to write the coded sub-block line in the write address corresponding to the coded sub-block line, wherein:
the coded sub-block line comprises a first coded sub-block line and a second coded sub-block line subsequent to the first coded sub-block line,
the first coded sub-block line comprises a first portion and a second portion subsequent to the first portion,
the second coded sub-block line comprises a first portion and a second portion subsequent to the first portion, and
the memory controller:
comprises a register in which line data can be stored, the line data comprising the second portions of the first and second coded sub-block lines;
determines a head address and an end address which define a storage area in the memory, the first and second coded sub-block lines being able to be stored in the storage area;
determines the head address as a first write address;
determines the end address as a second write address;
writes the first portion of the first coded sub-block line in a first write area where the first write address is a starting point;
writes the second portion of the first coded sub-block line in a duplicate memory line subsequent to the first write area;
writes the first portion of the second coded sub-block line in a second write area where the second write address is a starting point;
writes the second portion of the second coded sub-block line in the register;
transfers the second portion of the first coded sub-block line from the memory to the register; and
writes the line data in the duplicate memory line, the line data comprising the second portions of the first and second coded sub-block lines, the second portions being stored in the register.

6. The encoder of claim 5, wherein the memory controller:
writes the first and second portions of the first coded sub-block line in forward directions of horizontal and vertical directions in the memory, and
writes the first and second portions of the second coded sub-block line in the forward direction of the horizontal direction in the memory and in a reverse direction of the vertical direction in the memory.

7. The encoder of claim 6, wherein the memory controller:
writes the second portion of the first coded sub-block line in a forward direction of a horizontal direction in the register, and
writes the second portion of the second coded sub-block line in in a reverse direction of the horizontal direction in the register.

8. An image encoder configured to write coded image data in a memory, the encoder comprising:
an encoding module configured to divide original image data comprising a plurality of pixels into a plurality of block lines, to divide each block line into a plurality of sub-block lines, to encode the original image data in each sub-block line, and to generate a plurality of coded sub-block lines;
a write address determining module configured to determine a write address of the memory in each coded sub-block line based on a number of the sub-block lines, an original image data size of the original image data, and image coding rate; and
a memory controller configured to write the coded sub-block line in the write address corresponding to the coded sub-block line, wherein:
the coded sub-block line comprises a first coded sub-block line and a second coded sub-block line subsequent to the first coded sub-block line,
the first coded sub-block line comprises a first portion and a second portion subsequent to the first portion,
the second coded sub-block line comprises a first portion and a second portion subsequent to the first portion, and
the memory controller:
comprises a register in which line data can be stored, the line data comprising the second portions of the first and second coded sub-block lines;
determines a head address and an end address which define a storage area in the memory, the first and second coded sub-block lines being able to be stored in the storage area;
determines the head address as a first write address;
determines an address returning from the end address by a write unit of the memory as a second write address;
writes the first portion of the first coded sub-block line in a first write area where the first write address is a starting point;
writes the first portion of the second coded sub-block line in a reverse direction of a vertical direction of a memory space in a second write area where the second write address is a starting point;
writes the line data in the register; and
writes the line data stored in the register in a duplicate memory line subsequent to the first write area.

9. The encoder of claim 8, wherein the memory controller:
writes the first and second portions of the first coded sub-block line in forward directions of horizontal and vertical directions in the memory, and
writes the first and second portions of the second coded sub-block line in the forward direction of the horizontal direction in the memory and in a reverse direction of the vertical direction in the memory.

10. The encoder of claim 9, wherein the memory controller:
  writes the second portion of the first coded sub-block line in a forward direction of a horizontal direction in the register, and
  writes the second portion of the second coded sub-block line in a reverse direction of the horizontal direction in the register.

* * * * *